(12) United States Patent
Foreman et al.

(10) Patent No.: US 10,296,704 B2
(45) Date of Patent: *May 21, 2019

(54) PARAMETER COLLAPSING AND CORNER REDUCTION IN AN INTEGRATED CIRCUIT

(71) Applicant: INTERNATIONAL BUSINESS MACHINES CORPORATION, Armonk, NY (US)

(72) Inventors: Eric Foreman, Fairfax, VT (US); Jeffrey Hemmett, St. George, VT (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/959,398

(22) Filed: Apr. 23, 2018

(65) Prior Publication Data

US 2018/0357356 A1 Dec. 13, 2018

Related U.S. Application Data

(63) Continuation of application No. 15/704,429, filed on Sep. 14, 2017, now Pat. No. 10,037,402, which is a
(Continued)

(51) Int. Cl.
*G06F 17/50* (2006.01)

(52) U.S. Cl.
CPC ........ *G06F 17/5081* (2013.01); *G06F 17/504* (2013.01); *G06F 17/5031* (2013.01);
(Continued)

(58) Field of Classification Search
USPC ................................................ 716/110–116
See application file for complete search history.

(56) References Cited

U.S. PATENT DOCUMENTS

| 7,403,884 B2 | 7/2008 | Hemmett |
| 7,480,881 B2 | 1/2009 | Tetelbaum et al. |

(Continued)

FOREIGN PATENT DOCUMENTS

| EP | 1890192 A1 | 2/2008 |
| EP | 2560073 A1 | 2/2013 |
| WO | 2013173538 A3 | 11/2013 |

OTHER PUBLICATIONS

IBM, List of IBM Patents or Patent Applications Treated as Related, Appendix P, dated Mar. 28, 2018, 2 pages.
(Continued)

*Primary Examiner* — Binh C Tat
(74) *Attorney, Agent, or Firm* — Anthony R. Curro (57) ABSTRACT

Reducing the runtime overhead needed for testing of an integrated circuit design. A determination may be made of parameters that clock routing and data routing in an integrated circuit are dependent upon. A determination is made of whether the parameters are suitable for compaction, such as by determining whether the parameters are utilized in only one of clock routing or data routing. The parameters suitable for compaction are defined or redefined into at least one proxy compacted parameter. A timing analysis for the integrated circuit is performed using the proxy compacted parameter instead of performing the timing analysis using the parameters suitable for compaction.

1 Claim, 8 Drawing Sheets

Related U.S. Application Data continuation of application No. 15/620,992, filed on Jun. 13, 2017.

(52) U.S. Cl.
CPC ...... *G06F 2217/10* (2013.01); *G06F 2217/62* (2013.01); *G06F 2217/84* (2013.01)

(56) References Cited

U.S. PATENT DOCUMENTS

| | | | |
|---|---|---|---|
| 7,844,418 | B2 | 11/2010 | Hemmett |
| 7,849,429 | B2 | 12/2010 | Hemmett et al. |
| 7,853,443 | B2 | 12/2010 | Hemmett |
| 7,873,926 | B2 | 1/2011 | Buck et al. |
| 8,086,976 | B2 | 12/2011 | Hemmett et al. |
| 8,108,816 | B2 | 1/2012 | Foreman et al. |
| 8,141,012 | B2 | 3/2012 | Buck et al. |
| 8,141,014 | B2 | 3/2012 | Foreman et al. |
| 8,201,120 | B2 | 6/2012 | Soreff et al. |
| 8,413,095 | B1 | 4/2013 | Dubuque et al. |
| 8,418,107 | B2 | 4/2013 | Hemmett et al. |
| 8,423,328 | B2 | 4/2013 | Cohn et al. |
| 8,458,632 | B2 | 6/2013 | Foreman et al. |
| 8,468,483 | B2 | 6/2013 | Buck et al. |
| 8,560,989 | B2 | 10/2013 | Buck et al. |
| 8,572,532 | B1 | 10/2013 | Singh et al. |
| 8,683,409 | B2 | 3/2014 | Hemmett et al. |
| 8,689,158 | B2 | 4/2014 | Kalafala et al. |
| 8,707,233 | B2 | 4/2014 | Foreman et al. |
| 8,719,743 | B1 | 5/2014 | Kollaritsch et al. |
| 8,768,679 | B2 | 7/2014 | Buck et al. |
| 8,769,452 | B2 | 7/2014 | Buck et al. |
| 8,788,995 | B1 | 7/2014 | Kumar et al. |
| 8,799,840 | B1 | 8/2014 | e Silva et al. |
| 8,806,402 | B2 | 8/2014 | Buck et al. |
| 8,832,625 | B2 | 9/2014 | Foreman et al. |
| 8,839,167 | B1 | 9/2014 | Dreibelbis et al. |
| 8,843,864 | B2 | 9/2014 | Lee et al. |
| 8,850,378 | B2 | 9/2014 | Buck et al. |
| 8,856,709 | B2 | 10/2014 | Foreman et al. |
| 8,949,765 | B2 | 2/2015 | Buck et al. |
| 9,400,864 | B2 | 7/2016 | Hathaway et al. |
| 9,483,604 | B1 | 11/2016 | Foreman et al. |
| 9,495,497 | B1 | 11/2016 | Buck et al. |
| 9,501,609 | B1 | 11/2016 | Foreman et al. |
| 9,519,747 | B1 | 12/2016 | Buck et al. |
| 10,037,402 | B1* | 7/2018 | Foreman ............ G06F 17/5081 |
| 2005/0132306 | A1 | 6/2005 | Smith et al. |
| 2006/0008097 | A1 | 1/2006 | Stenberg et al. |
| 2006/0044932 | A1* | 3/2006 | Arp ................ G01R 31/31723 365/63 |
| 2009/0031268 | A1 | 1/2009 | Miranda et al. |
| 2009/0288051 | A1 | 11/2009 | Hemmett et al. |
| 2010/0218152 | A1 | 8/2010 | Tehrani et al. |
| 2012/0030641 | A1 | 2/2012 | Mottaez et al. |
| 2012/0102448 | A1 | 4/2012 | Haugestuen et al. |
| 2016/0283637 | A1 | 9/2016 | Folberth et al. |
| 2016/0283640 | A1 | 9/2016 | Foreman et al. |

OTHER PUBLICATIONS

Pending U.S. Appl. No. 15/959,381, filed Apr. 23, 2018, entitled: Parameter Collapsing and Corner Reduction in an Integrated Circuit.

Van De Waerdt, "The TM3270 Media-processor", ISBN 90-9021060-1, Philips Electronics N.V. 2006, pp. 1-13.

Mell et al., "The NIST Definition of Cloud Computing", National Institute of Standards and Technology, Special Publication 800-145, Sep. 2011, pp. 1-7.

Wikipedia, "Process Corners", https://en.wikipedia.org/wiki/Process_corners, printed Jun. 8, 2017, pp. 1-3.

"VLSI Concepts", http://www.vlsi-expert.com/2011/03/static-timing-analysis-sta-basic-timi . . . , "Timing Paths": Static Timing Analysis (STA) basic (Part 1) |VLSI Con . . . , printed Jun. 8, 2017, pp. 1-14.

"Digital chip design articles, tutorials, classes and news", http://asic-soc.blogspot.com/2009/06/timing-paths.html, ASIC-System on Chip-VLSI Design: Timing paths, printed Jun. 8, 2017, pp. 1-5.

Pending U.S. Appl. No. 15/620,992, filed Jun. 13, 2017, entitled: "Parameter Collapsing and Corner Reduction in an Integrated Circuit".

Pending U.S. Appl. No. 15/704,429, filed Sep. 14, 2017, entitled: "Parameter Collapsing and Corner Reduction in an Integrated Circuit".

* cited by examiner

PARAMETER COLLAPSING AND CORNER REDUCTION IN AN INTEGRATED CIRCUIT

BACKGROUND

The present invention relates generally to the field of static timing analysis of a microchip or an integrated circuit design, and more particularly to analysis and reduction of runtime overhead needed for statistical static timing analysis of an integrated circuit design.

BRIEF SUMMARY

Embodiments of the present invention disclose a method, system, and computer program product for using a computing device to reduce runtime overhead needed for testing of an integrated circuit design. The computing device determines parameters that clock routing and data routing in the integrated circuit are dependent upon. The computing device determines whether the parameters are suitable for compaction by determining whether the parameters are utilized in only one of clock routing and data routing. The computing device redefines the parameters suitable for compaction into at least one proxy compacted parameter. The computing device performs a timing analysis for the integrated circuit using the at least one proxy compacted parameter, instead of performing the timing analysis using the parameters suitable for compaction.

In an alternative embodiment, the present invention discloses a method, system, and computer program product for using a computing device to reduce the runtime overhead needed for testing of an integrated circuit design. Parameters of the integrated circuit design suitable for compaction are determined. The parameters suitable for compaction are defined into at least one proxy compacted parameter set. A timing analysis is performed for the integrated circuit design utilizing the proxy compacted parameter set.

DETAILED DESCRIPTION

Integrated circuits continue to increase in complexity, while consumers and corporations demand increasingly accelerated design and testing phases to send a finished product to the market in the fastest way possible. As manufacturing process and environmental variation in the integrated circuit increases more process corners are required to cover variation which may slow down development of the integrated circuit into a commercial product. Process corners are the extremes of parameter variation under which the integrated circuit must be designed to function. A need therefore exists for a more efficient manner of testing an integrated circuit design before production. Presented is a method, system and computer program product for parameter collapsing and corner reduction, allowing the collapsing of integrated circuit parameters during the course of testing to allow multiple parameters to be tested as one, and corresponding reduction in the number of corners needed for testing of the integrated circuit.

"Parameters" as described with reference to this patent application are any of sources of variation which arise in the course of design of an integrated circuit which impact the delay or slew of voltage through elements of the integrated circuit, and hence impact circuit performance. Since integrated circuits are engineered and fabricated on a very small scale, the nearly microscopic or microscopic components utilized in the integrated circuit are subject to some variation simply because of their extremely small size. Parameters may include, by means of non-limiting example, variation in a width of a fabricated component in the integrated circuit, variation in a thickness of a fabricated component in the integrated circuit, variation in a wire segment or a silicon transistor shape in the integrated circuit, line edge roughness of a metal or a silicon in the integrated circuit, variation in dopants or implants utilized in the manufacture of the integrated circuit, variations in device threshold voltage, variations in supply voltage for the integrated circuit, and variations in a temperature across the integrated circuit. The effects of these parameters on circuit performance must be evaluated, as further described herein, to ensure the design functions with adequate yield over the full range of manufacturing and environmental conditions.

Figure 1:
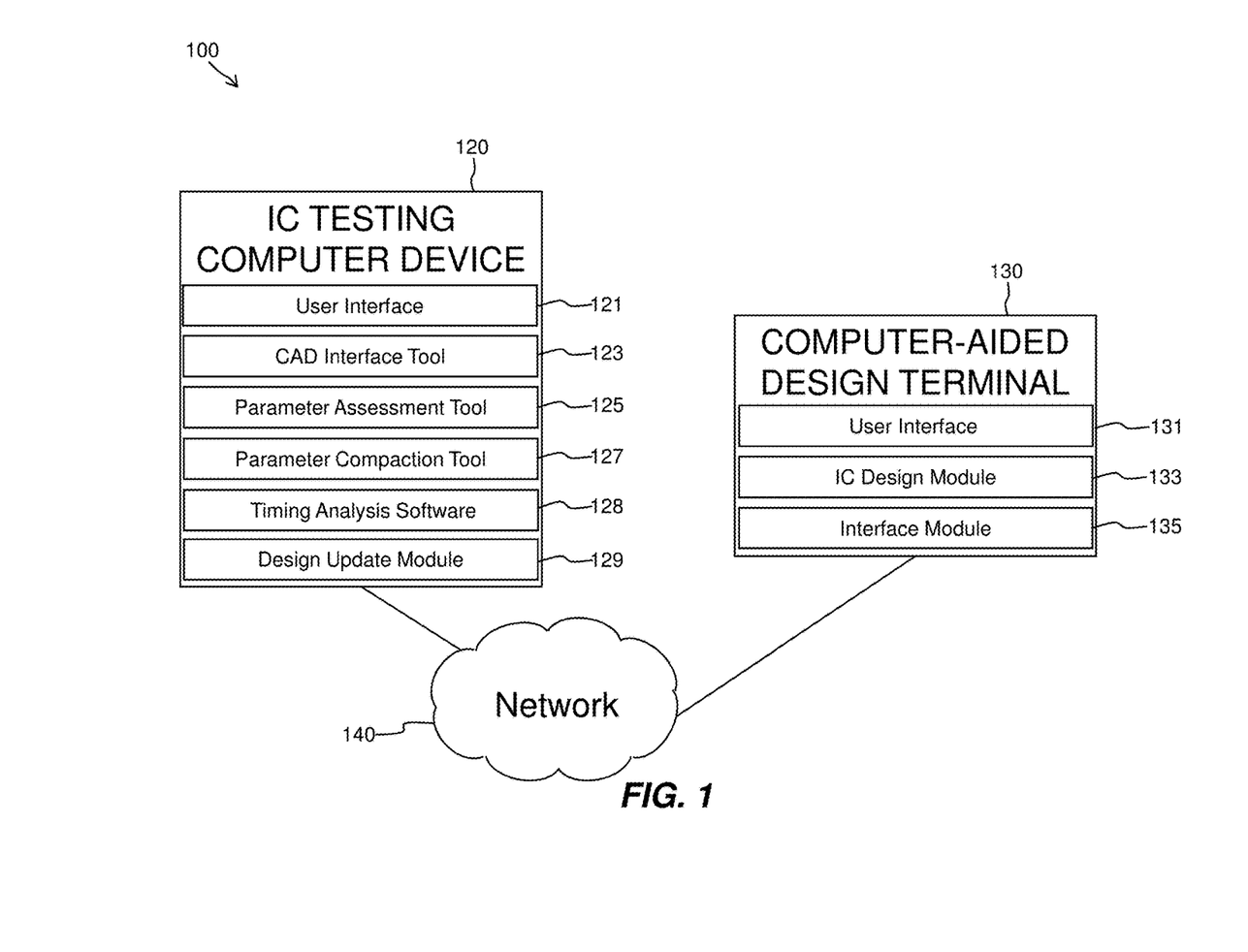
FIG. 1 is a functional block diagram illustrating an environment for testing and improving runtime overhead for an integrated circuit design, in accordance with an embodiment of the present invention.

FIG. 1 is a functional block diagram illustrating an environment for testing and improving runtime overhead for an integrated circuit 100, in accordance with an embodiment of the present invention. In an exemplary embodiment, included in the environment 100 is an IC Testing Computer Device 120 and a Computer-Aided Design Terminal 130, all interconnected via a network 140.

In various embodiments, network 140 represents, for example, an intranet, a local area network (LAN), a wide area network (WAN) such as the Internet, and includes wired, wireless, or fiber optic connections. In general, network 140 may be any combination of connections and protocols that will support communications between IC Testing Computer Device 120 and Computer-Aided Design Terminal 130, in accordance with an embodiment of the invention.

In various embodiments, IC Testing Computer Device 120 and Computer-Aided Design Terminal 130 may be, for example, a mainframe or a mini computer, a terminal, a laptop, a tablet, a netbook personal computer (PC), a mobile device, or a desktop computer, or any other sort of computing, in accordance with the embodiments described herein. IC Testing Computer Device 120 and Computer-Aided Design Terminal 130 may include internal and external hardware components as depicted and described in further detail below with reference to FIG. 6, below. In other embodiments, each of IC Testing Computer Device 120 and Computer-Aided Design Terminal 130 may be implemented in a cloud computing environment, as described in relation to FIGS. 7 and 8, below. In a still further embodiment, the IC Testing Computer Device 120 and Computer-Aided Design Terminal 130 are embodied in physically the same computing device, with all communications between various components made internally.

IC Testing Computer Device 120, in effect, represents any sort of computing device possessing sufficient processing power to execute software to be utilized in testing of an integrated circuit design. The IC Testing Computer Device 120 terminal may, in testing the integrated circuit design, utilize a hosted workload 96 as displayed in connection with FIG. 8 below, and/or perform other tasks as further described herein. In the exemplary embodiment, IC Testing Computer Device 120 includes a User Interface 121, a CAD Interface Tool 123, a Parameter Assessment Tool 125, a Parameter Compaction Tool 127, Timing Analysis Software 128, and a Design Update Module 129.

User Interface 121 represents an IC Testing Computer Device 120 installation of a software interface for accessing and utilizing the IC Testing Computer Device 120. In practice, the User Interface 121 may accessed by a keyboard, mouse, touch screen, or any other type of input device. The User Interface 121 may not be present at all in embodiments of the invention where all the functionality such as further described below occurs in a purely automated fashion.

CAD Interface Tool 123 represents software for accessing, downloading, and analyzing integrated circuit designs such as prepared on the Computer-Aided Design Terminal 130, as is further discussed below. In a further embodiment, the CAD Interface Tool 123 also provides functionality by which a proposed update circuit design is transmitted back to the Computer-Aided Design Terminal 130 for implementation as a new design (as discussed further below in connection with the Design Update Module 129).

Parameter Assessment Tool 125 represents software for determining parameters that clock routing and data routing in an integrated circuit are dependent upon. A clock signal, such as propagated through clock routing, as is commonly understood by one of skill in the art, is at least one oscillating signal used within the integrated circuit to keep time so as to sync actions of the integrated circuit. Syncing actions of the integrated circuit is particularly important with regard to data signal(s) which travel through varied logic circuits within the integrated circuit, and, depending on routing decisions made, could arrive at the same portions of the logic circuits at different times because of the different relative lengths of the path of the logic circuit, different paths, etc. Syncing actions of the data signal may include, for example, ascertaining that the data signal arrives at various points within the integrated circuit at the correct time. As the signals propagate through the integrated circuit, each of clock routing and data routing travels through a variety different components that are composed of different "parameters." Whether the parameters be varying levels of fabricated components within the integrated circuit, certain wire segments, etc., since the parameters could have the effect of speeding up or delaying the various clock signals and data signals at issue, they must be modeled before manufacture. The Parameter Assessment Tool 125, in effect, evaluates sources of variation unique to the clock routing, evaluates sources of variation unique to the data routing, and/or determines parameters having insignificant impact on either. In an alternative embodiment, the Parameter Assessment Tool 125 leverages design knowledge of which parameters are suitable for compaction, the design knowledge obtained during an initial design phase.

Parameter Assessment Tool 125 also represents software for determining whether the parameters that clock routing and data routing are dependent upon are suitable for compaction, via a determination of whether the parameters appear in and are utilized in only one of clock routing and data routing. If the parameters appear in both clock routing and data routing, the parameters may not be suitable for compaction. The Parameter Assessment Tool 125 may further determine whether it is physically feasible to compact parameters (i.e. is it physically legitimate to compact the parameters, such as because they are all of the same family of parameter variation (for example, metal layer thickness), or because independent modeling is otherwise not required for any needed analysis).

Parameter Compaction Tool 127 represents software which redefines parameters for compaction into at least one proxy compacted parameter, if appropriate. In effect, the Parameter Compaction Tool 127 redefines the parameters to be compacted into a lesser number of parameters, so as to lower the number of parameters tested. This process is further described below.

Timing Analysis Software 128 represents software for actually performing a timing analysis and testing the parameters in the integrated circuit. If any parameters have been combined into proxy compacted parameters, the timing analysis is performed upon the proxy compacted parameter rather than independently upon each parameter which has been compacted. This serves to realize an advantage of the invention in reducing runtime overhead, obviating the need to test each parameter individually. The timing analysis, as understood by one of skill in the art, is typically a statistical static timing analysis ("SSTA"). SSTA, or other timing analysis, is an important step in design of integrated circuits because it is the step in design where race conditions or hazards which could cause an integrated circuit to malfunction are identified, the speed of the integrated circuit is determined, and obstacles which lower the operational speed of the integrated circuit are found, among other reasons.

The proxy compacted parameters may be tested by an SSTA path-based algorithm, an SSTA block-based algorithm, or another. Block-based algorithms, the most efficient technique, compute signal arrival times (or signal required arrival times) as functions of process parameters for each circuit node in its topological order. Path-based SSTA algorithms, on the other hand, analyze each signal propagation path separately, and calculate the probability distribution for circuit delay as the probabilistic maximum of all path delays. Path-based SSTA algorithms are less commonly used than block-based algorithms. The end result of a timing analysis performed by the Timing Analysis Software 128 is dependent upon the number of parameters that may be collapsed. The runtime needed for testing of the integrated circuit design scales nearly linearly with the number of parameters being modeled, and so the runtime reduction introduced by collapsing of parameters scales roughly linearly with the number of parameters collapsed.

In a further embodiment, the Timing Analysis Software 128 may also test all other parameters present in the integrated circuit individually which have not been proxy compacted. The results of the Timing Analysis Software 128 may simply be a "pass" or a "fail." In a further embodiment, the proxy compacted parameter is not analyzed independently, but rather applied as a mean shift after calculation. In this embodiment, once the collapsed level of variation has been quantified with the proxy compacted parameter(s), it is applied as a shift to the mean of the timing distribution for propagation, rather than being propagated as an additional independent source of variation.

The Design Update Module 129 generates an updated circuit design for the integrated circuit if the timing analysis fails, the updated circuit design allowing the integrated circuit design to pass the timing tests presented. The Design Update Module 129 is shown as implemented in the IC Testing Computer Device 120, but in a further embodiment is implemented directly in the Computer-Aided Design Terminal 130, or elsewhere. The updated circuit design is targeted at a correction of the flaw in the integrated circuit leading to the failure of the timing analysis, and serves to allow the integrated circuit to pass a subsequent timing analysis. The newly updated design as well may require testing, such as presented by the current invention. Alternately, instead of suggesting an updated circuit design by the Design Update Module 129, the Design Update Module 129 may automatically present a waiver to a user. The waiver provides informed consent that the integrated circuit design has failed testing to the user, but allows the failed design to proceed to manufacture, if desired.

Continuing with regard to FIG. 1, Computer-Aided Design Terminal 130, as stated previously, represents any sort of computing platform possessing sufficient processing power to execute software to be utilized in testing of an integrated circuit design, and perform the other tasks as further described herein. In the exemplary embodiment, Computer-Aided Design Terminal 130 includes a User Interface 131, an IC Design Module 133, and an Interface Module 135. The Computer-Aided Design Terminal 130, as described in more detail below, is involved in the generation of computer-aided design plans for integrated circuits.

User Interface 131 allows a user to access and utilize the Computer-Aided Design Terminal 130 for the design of integrated circuits. Various tools are available for the design of various aspects of the integrated circuit, as well as visualize the results in various stages of completion. As would be understood by one of skill in the art, the design of integrated circuits is at least in-part automated, to account for their extremely complex nature.

IC Design Module 133, after receiving inputs from the User Interface 131 regarding various characteristics of the IC design requested by the user, produces a design of the integrated circuit accounting for design objectives, various known rules, and design limitations, some of which may be unique to the design and some of which are general to all integrated circuit design.

The Interface Module 135 is a software module for communication with the IC Testing Computer Device 120. In effect, the interface module 135 transmits a proposed IC design to the IC Testing Computer Device 120 (specifically via the CAD Interface Tool 123), and, after the IC Testing Computer Device 120 has finished testing the proposed design, receives the results of testing performed.

Figure 2:
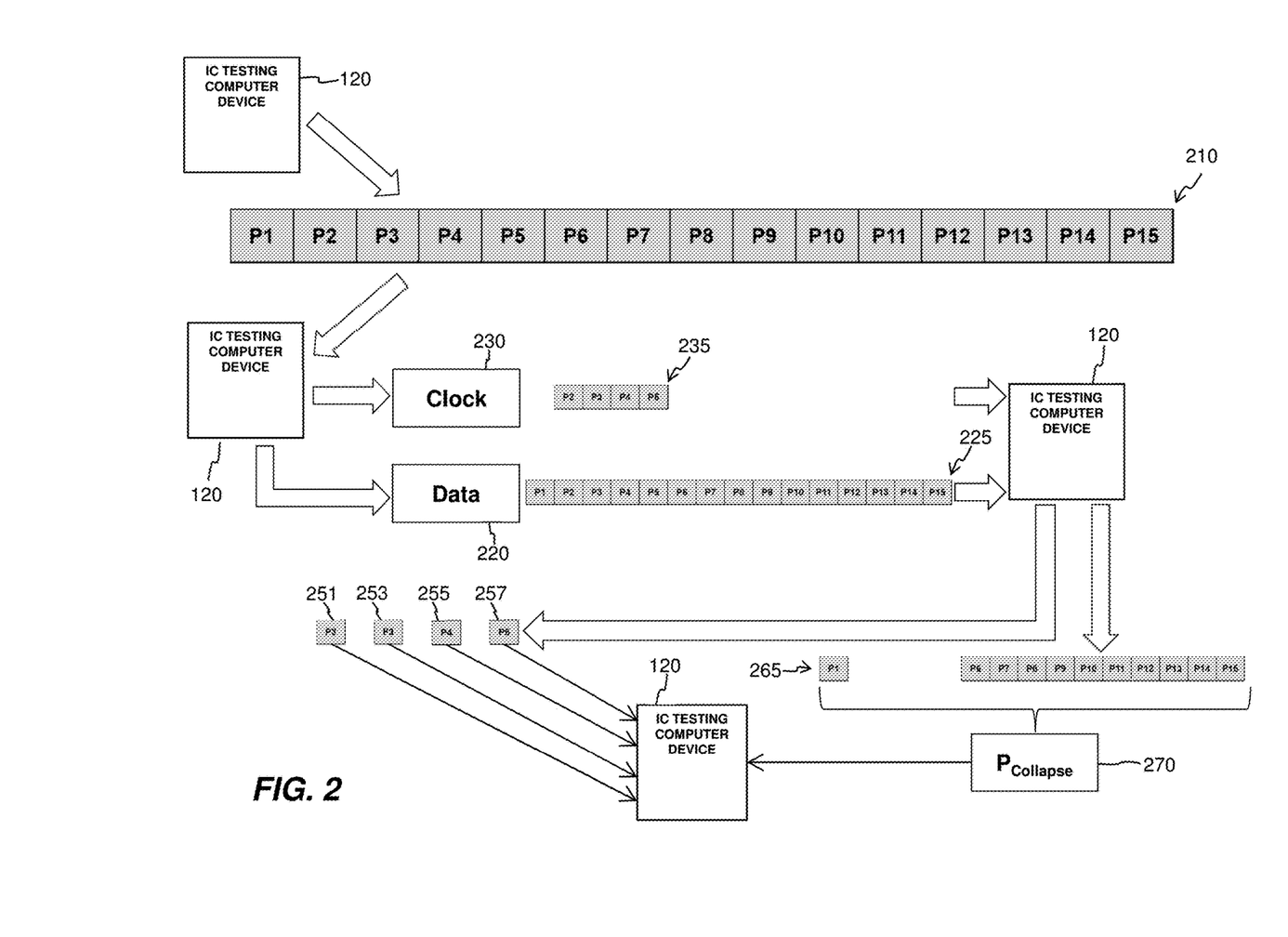
FIG. 2 is a process flow diagram showing a process of redefining parameters for compaction and performing a timing analysis for the integrated circuit, in accordance with an embodiment of the present invention.

FIG. 2 is a process flow diagram showing a process of redefining parameters for compaction and performing a timing analysis for the integrated circuit, in accordance with an embodiment of the present invention. The IC Testing Computer Device 120 is pictured. The IC Testing Computer Device 120 receives an integrated circuit design for testing (such as from the Computer-Aided Design Terminal 130), through the CAD Interface Tool 123 associated with the IC Testing Computer Device 120. The IC Testing Computer Device 120, utilizing the Parameter Assessment Tool 125, determines the parameters that clock routing and data routing are dependent upon, or, in effect those parameters encountered in the various circuit elements traveled. The results are shown 210. Clock routing and data routing depend upon parameters P1, P2, P3, P4, P5, P6, P7, P8, P9, P10, P11, P12, P13, P14, and P15, as displayed 210.

Continuing with regard to FIG. 2, the IC Testing Computer Device 120, again using the Parameter Assessment Tool 125, then determines which parameters are encountered in only one of clock routing and data routing, but not both, and are therefore suitable for compaction. The IC Testing Computer Device 120 determines that clock routing 230 encounters only parameters P2, P3, P4, and P5, as displayed 235, whereas data routing 220 encounters all of parameters P1 through P15, as displayed 225. Such data is stored for later use by the IC Testing Computer Device 120, and the computer device 120 determines parameters P1, P6, P7, P8, P9, P10, P11, P12, P13, P14, and P15 are encountered exclusively in data routing 265. These parameters are, therefore, appropriate for redefinition and collapse into a proxy compacted parameter, for timing analysis purposes. The IC Testing Computer Device 120 then, via the Parameter Compaction Tool 127, redefines the parameters suitable for compaction 265 into at least one proxy compacted parameter, displayed $P_{collapse}$ 270 in FIG. 2. The IC Testing Computer Device 120, via the Timing Analysis Software 128, then performs the timing analysis for the integrated circuit using the proxy compacted parameter $P_{collapse}$ 270, rather than directly on the individual parameters suitable for compaction, and determines whether the integrated circuit passes or fails. On the other hand, parameters P2, P3, P4, and P5, as displayed 251, 253, 255, and 257, are encountered in both clock routing and data routing, so are not appropriate for compaction. The IC Testing Computer Device 120 proceeds to test each of these parameters individually, and determines whether each passes or fails.

Figure 3:
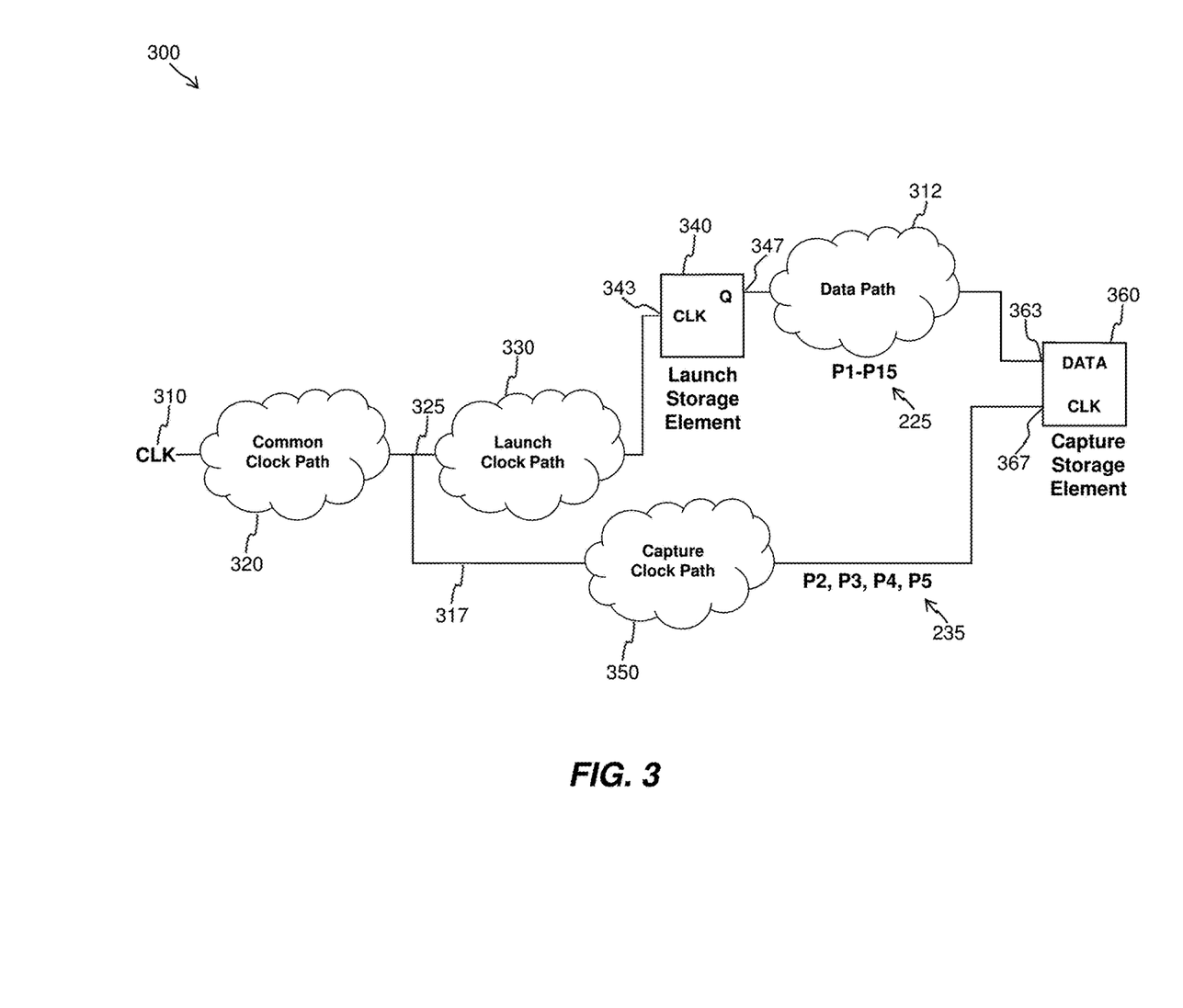
FIG. 3 is a simplified circuit diagram of clock paths and data paths, in accordance with an embodiment of the present invention.

FIG. 3 is a simplified circuit 300 diagram of clock paths and data paths, in accordance with an embodiment of the present invention. As understood by one of skill in the art, clock signal 310 is generated to be utilized by various components of the circuit 300 in maintaining synchronization among various components of the integrated circuit. The clock signal 310 on clock path can only have clock inverters and clock buffers as its elements. The common clock path 320, as displayed, along which the clock signal travels before traveling through junction 325.

The capture clock path 350 receives the clock signal transmitted along the clock path 317 from junction 325, before the clock signal arrives at clock input 367, and latches the data signal at data input 363 into capture storage element latch 360. As is displayed in FIG. 3, the clock signal travels through circuit elements sensitive to parameters P2, P3, P4, and P5, as displayed 235. The capture clock path 350 is also responsible for indicating to the latch 340 that data from the data path 312 is be stored in the latch 340, as further discussed below.

Launch clock path 330 is responsible for carrying a data signal once the clock signal reaches the launch storage element 340 at input 343. The data path 312 is then launched via output Q 347. The data signal on data path 312 can have any combination of gate along data path 312. The data signal at launch storage element output Q 347 travels along the data path 312 to data input 363 of capture storage element 360. As is displayed in FIG. 3, parameters P1 through P15 are utilized by the data signal traveling along the data path 312, as shown 225. As discussed elsewhere herein, knowledge of parameters that clock routing and data routing are dependent upon is necessary for the operation of the presently disclosed invention. So long as the data signal arrives at input 363 and the clock signal arrives at input 367 within a certain window of time of each other, the capture storage element 360 state changes, and further logical executions may occur in the simplified circuit 300 (not displayed here).

Figure 4:
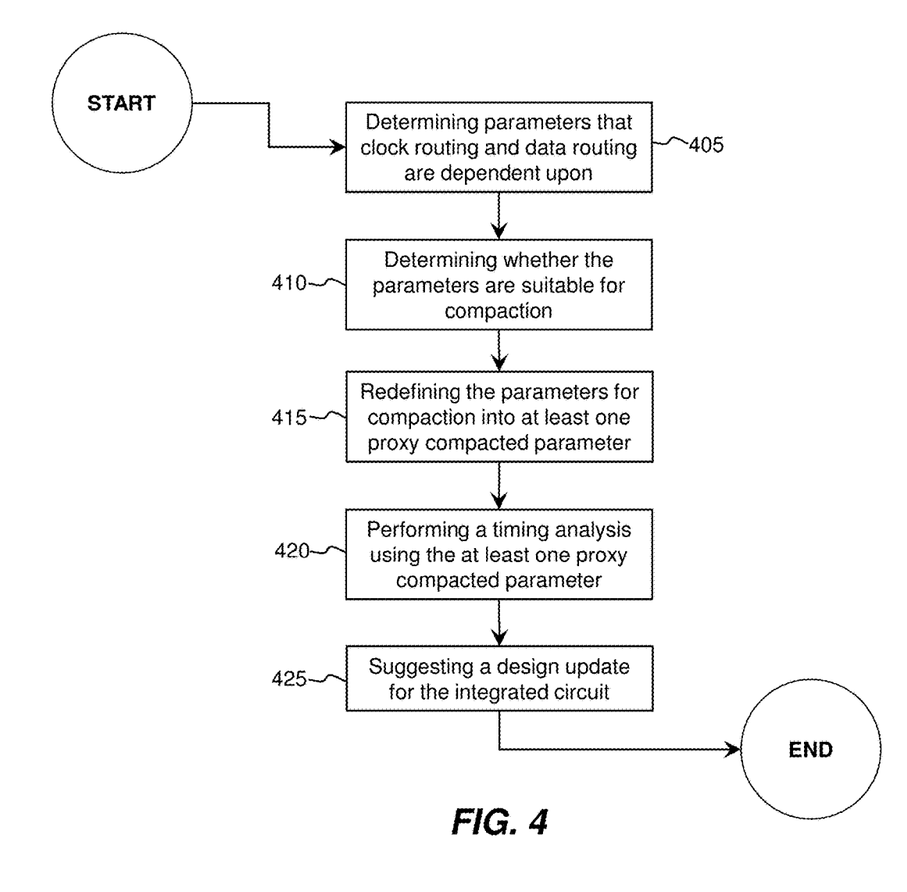
FIG. 4 is a flowchart depicting operational steps that a hardware component of a hardware appliance may execute, in accordance with an embodiment of the invention.

FIG. 4 is a flowchart depicting operational steps that a hardware and software component of a hardware appliance may execute, in accordance with an embodiment of the invention. At step 405, the Parameter Assessment Tool 125 determines parameters that clock routing and data routing in the integrated circuit are dependent upon. The Parameter Assessment Tool 125 may, in order to determine parameters that clock routing and data routing are dependent upon, evaluate sources of variation unique to the clock routing, evaluate sources of variation unique to the data routing, and/or determine parameters having insignificant impact on either. At step 410, the Parameter Assessment Tool 125 determines whether the parameters are suitable for compaction via a determination of whether the parameters are encountered in only one of clock routing and data routing in the integrated circuit. At step 415, the Parameter Compaction Tool 127 redefines the parameters suitable for compaction into at least one proxy compacted parameter. At step 420, Timing Analysis Software 128 performs a timing analysis for the integrated circuit using the at least one proxy compacted parameter instead of performing a timing analysis on the same parameters which have been compacted individually. The timing analysis may be, as discussed previously, an SSTA block-based analysis or an SSTA path-based analysis. Alternately, the proxy compacted parameter may not be analyzed independently but rather applied as a mean shift after calculation. At step 425, if the timing analysis fails, the Design Update Module 129 suggests an updated circuit design for the integrated circuit. The updated circuit design allows the integrated circuit to pass testing, as discussed elsewhere herein.

Figure 5:
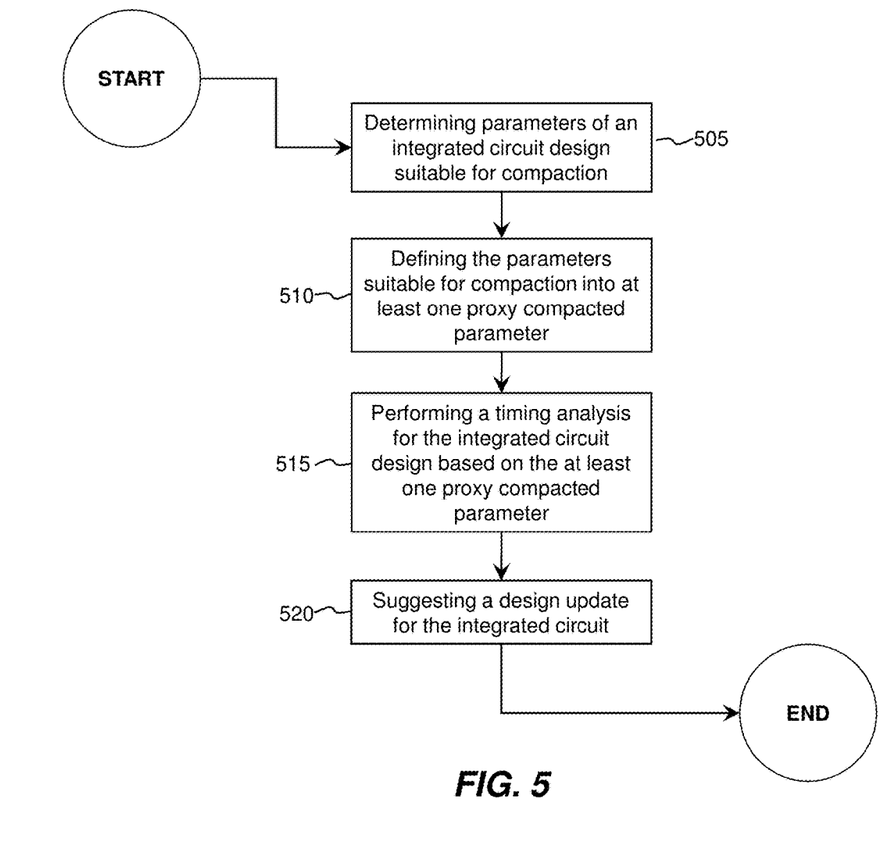
FIG. 5 is a flowchart depicting operation steps that a hardware component of a hardware appliance may execute, in accordance with an embodiment of the invention.

FIG. 5 is a flowchart depicting operation steps that a hardware component of a hardware appliance may execute, in accordance with an embodiment of the invention. At step 505, the Parameter Assessment Tool 125 determines parameters of an integrated circuit design suitable for compaction. At step 510, the Parameter Compaction Tool 127 defines the parameters suitable for compaction into at least one proxy compacted parameter set. At step 515, the Timing Analysis Software 128 performs a timing analysis for the integrated circuit using the at least one proxy compacted parameter set. As in previous embodiments, the timing analysis may be an SSTA block-based analysis or an SSTA path-based analysis. At step 520, the Design Update Module 129 suggest an updated circuit design for the integrated circuit.

Figure 6:
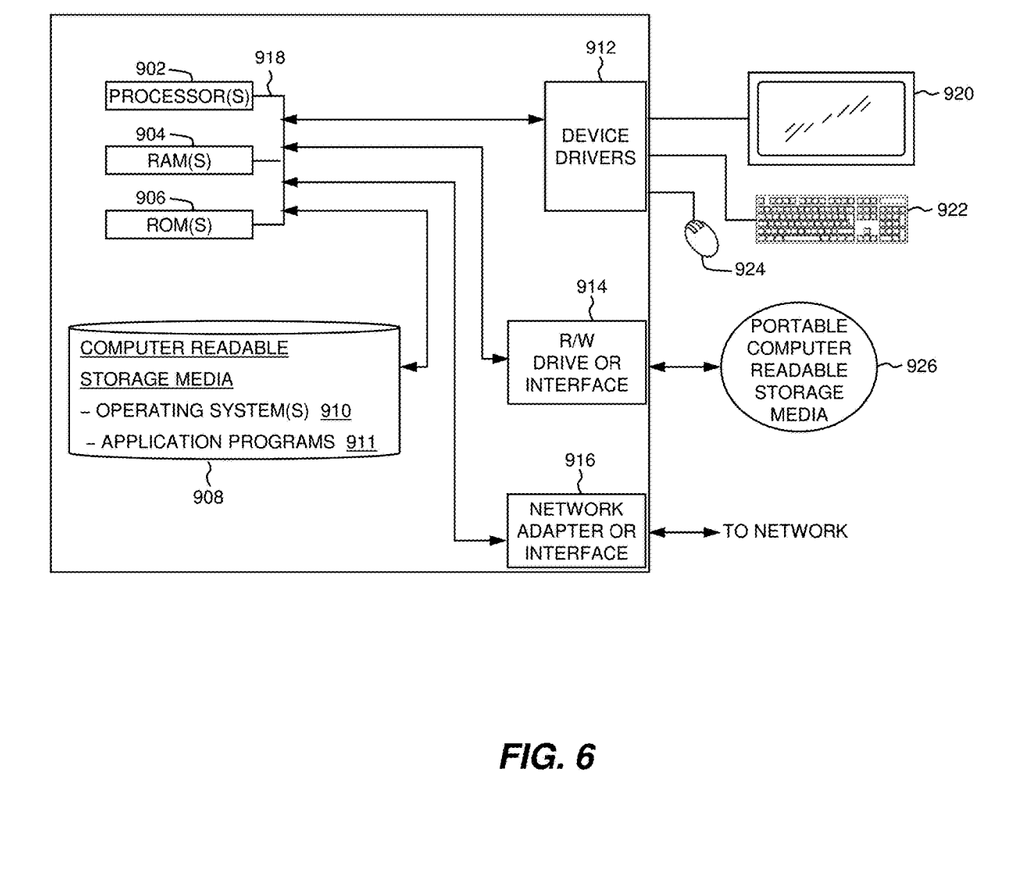
FIG. 6 depicts a block diagram of components of user computer and/or computer executing computer aided design software of FIG. 1, in accordance with an embodiment of the present invention.

FIG. 6 depicts a block diagram of components of IC Testing Computer Device 120 of the environment for testing and improving runtime overhead for an integrated circuit design of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

IC Testing Computer Device 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, presentation program 110, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

IC Testing Computer Device 120 may also include a R/W drive or interface 914 to read from and write to one or more portable computer readable storage media 926. Application programs 911 on IC Testing Computer Device 120 may be stored on one or more of the portable computer readable storage media 926, read via the respective R/W drive or interface 914 and loaded into the respective computer readable storage media 908.

IC Testing Computer Device 120 may also include a network adapter or interface 916, such as a TCP/IP adapter card or wireless communication adapter (such as a 4G wireless communication adapter using OFDMA technology). Application programs 911 IC Testing Computer Device 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

IC Testing Computer Device 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, system, and/or computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
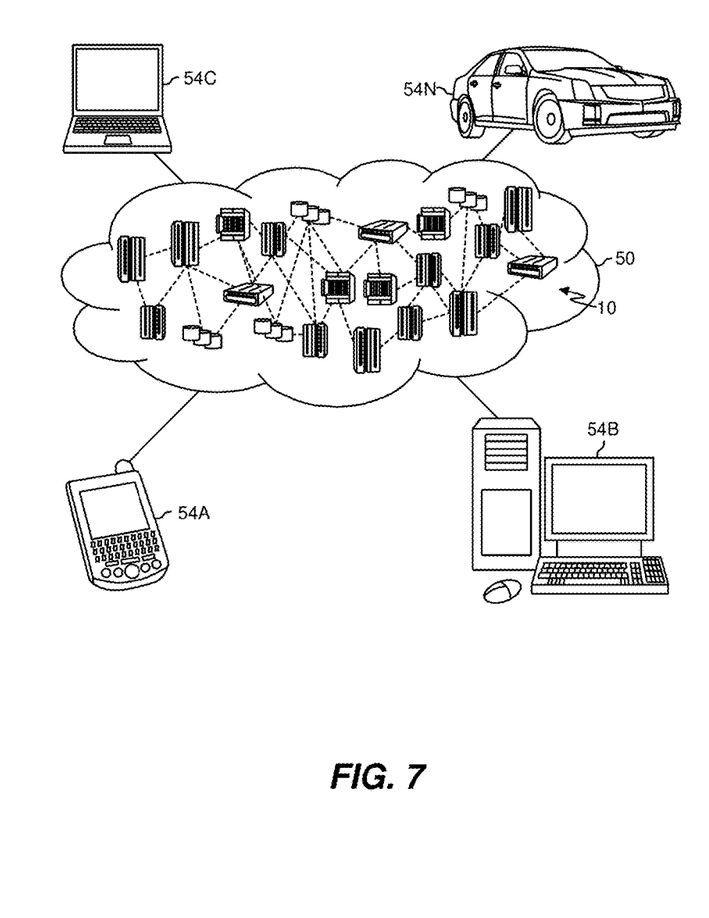
FIG. 7 depicts a cloud computing environment, in accordance with an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
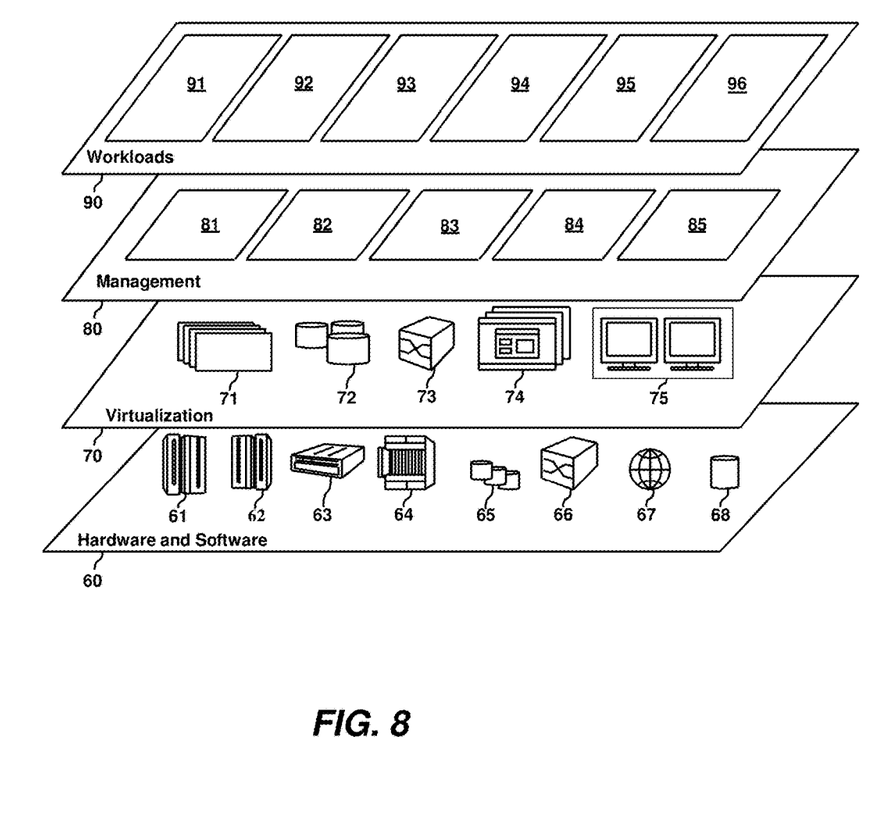
FIG. 8 depicts abstraction model layers, in accordance with an embodiment of the present invention.

Referring now to FIG. 8, a set of functional abstraction layers provided by cloud computing environment 50 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment for testing and improving runtime overhead for an integrated circuit design 96.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A computer program product using a computing device to reduce a runtime overhead needed for testing of an integrated circuit design, the computer program product comprising:
one or more non-transitory computer-readable storage media and program instructions stored on the one or more non-transitory computer-readable storage media, the program instructions, when executed by the computing device, cause the computing device to perform a method comprising:
determining, by the computing device, parameters that clock routing and data routing in an integrated circuit are dependent upon, the parameters comprising any source of variation in the integrated circuit which impact a delay or slew of voltage through the integrated circuit;
determining, by the computing device, whether the parameters are suitable for compaction by determining whether the parameters are utilized in only one of clock routing and data routing;
redefining, by the computing device, the parameters suitable for compaction into at least one proxy compacted parameter containing a lesser number of parameters to lower a number of parameters tested;
performing, by the computing device, a path-based or a block-based statistical static timing analysis for the integrated circuit using the at least one proxy compacted parameter instead of performing the timing analysis using the parameters suitable for compaction;
generating an updated circuit design for the integrated circuit if the integrated circuit design fails the statistical static timing analysis; and
fabricating the updated circuit design,
wherein the parameters are selected from a group consisting of one or more of the following: variation in a thickness of a fabricated component in the integrated circuit, variation in a wire segment or silicon transistor shape in the integrated circuit, variation in dopants or implants utilized in the manufacture of the integrated circuit, variations in device threshold voltage, variations in supply voltage for the integrated circuit, variations in device threshold voltage, variations in supply voltage for the integrated circuit, and variations in a temperature across the integrated circuit.

* * * * *